Aug. 6, 1968 G. ODONE 3,395,605
TELEMETER
Filed April 30, 1964 2 Sheets-Sheet 1
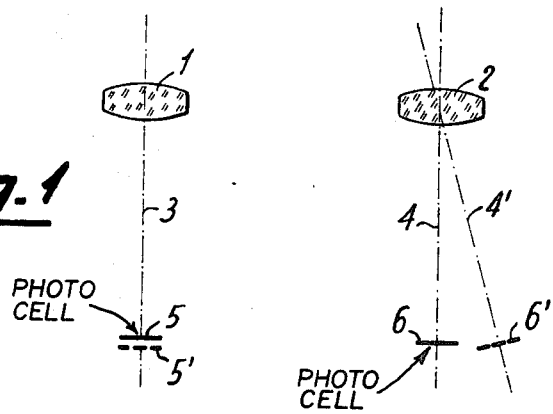
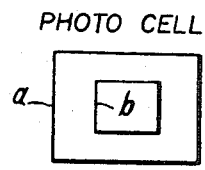
Fig. 2
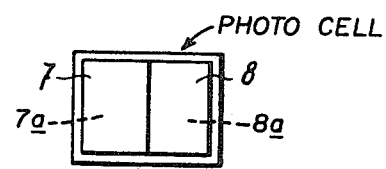
Fig. 3
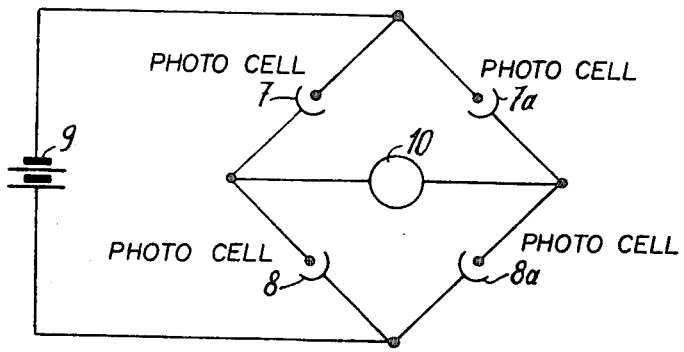
Fig. 4
INVENTOR
GIOVANNI ODONE
BY Emory L. Groff Jr.
ATTORNEY Aug. 6, 1968 G. ODONE 3,395,605
TELEMETER
Filed April 30, 1964 2 Sheets-Sheet 2
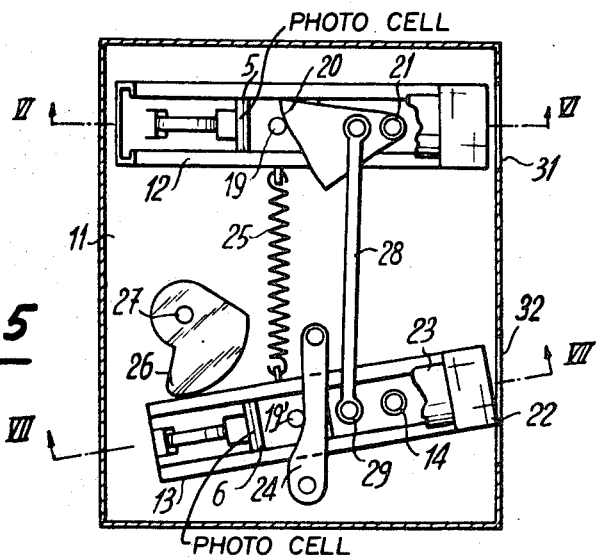
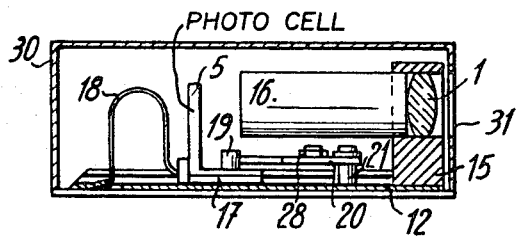
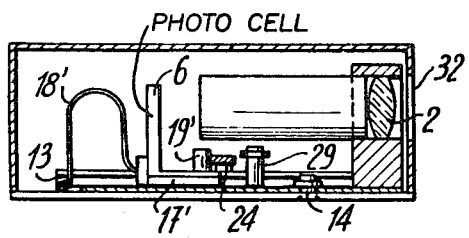
INVENTOR
GIOVANNI ODONE
BY Emery L. Groff Jr.
ATTORNEY 3,395,605
TELEMETER
Giovanni Odone, Yverdon, Switzerland, assignor to
Paillard S.A., Sainte-Croix, Switzerland
Filed Apr. 30, 1964, Ser. No. 363,951
Claims priority, application Switzerland, May 11, 1963,
5,925/63
4 Claims. (Cl. 88—1)

ABSTRACT OF THE DISCLOSURE

A telemeter including a dual optical system, wherein, one unit is fixed relative to the object to be photographed and the other is manually adjustable, said units including photocells adapted to receive a portion of the selected image, and means for comparing the currents fed by said cells.

---

Telemeters are known which include conventionally an optic system forming two images of the object of which it is desired to measure the distance from the observer, said images being laterally shifted with reference to each other by an amount depending on the angular direction along which said object appears when seen from two spaced points.

For certain technical applications, chiefly for photographic, kinematographic and television purposes, it may be of interest to use a telemeter operating automatically and adapted to be used for controlling for instance the automatic focusing of a view-taking objective.

The present invention has for its object such a telemeter including an optic system forming two images of the object of which it is desired to measure the distance from the observer. According to the invention, said telemeter includes at least two photo-cells adapted to receive each at least a fraction of said images and means for comparing the currents fed by said cells.

The accompanying drawings illustrate diagrammatically and by way of example a preferred embodiment of the improved telemeter according to the invention. In said drawings:

FIGURE 1 illustrates the operative principle underlying said telemeter;

FIGURES 2 and 3 are front views of two photo-cell arrangements;

FIGURE 4 is a wiring diagram of a bridge incorporating a plurality of photo-cells;

FIGURE 5 illustrates a mechanical embodiment of the telemeter to be associated with the photo-cells;

FIGURE 6 is a cross-section through line VI—VI of FIGURE 5;

FIGURE 7 is a cross-section through line VII—VII of FIGURE 5.

Turning to FIGURE 1, the telemeter illustrated includes two optic systems 1 and 2 which may be constituted each by a single lens. The optic axes 3 and 4 of said two systems are parallel and their lateral spacing defines the base of the telemeter. The latter includes furthermore two photo-cells 5 and 6 located respectively to the rear of the corresponding optic systems 1 and 2 substantially in the focal planes of the latter.

When the object sighted by the telemeter is at an infinite distance, the images formed on the cells 5 and 6 are identical and consequently the currents fed by said cells are equal. When the telemeter serves for sighting a comparatively near object, the images formed on the two photo-cells 5 and 6 are different and a difference is then observed between the currents fed by said cells.

In the case where a comparatively near object lies on the optic axis 3 of the telemeter, the axis 4' illustrates diagramatically the direction along which the object is seen through the optic system 2. If the cell 6 is then shifted into the oblique position illustrated at 6', it receives again an image which is substantially similar to that impinging on the photo-cell 5. However, it is of advantage for the first photo-cell 5 to be shifted along its axis into the position 5' so as to take into account the shifting of the plane in which the image is formed as a result of the relative proximity of the object sighted. These positions 5' and 6' allow the cells 5 and 6 to feed currents of equal intensities as previously mentioned. To each angular position of the sighting axis 4' through the optic system 2 there corresponds a predetermined position for the plane in which the image is formed by the optic system 1. It is therefore possible to simultaneously shift the cells 5 and 6 through gauged means which ensure at any moment correspondence between the cooperating positions of the two photo-cells for all the distances adapted to be measured by the telemeter. Consequently, when the cells are thus shifted, it is sufficient to observe the moment at which the current intensities supplied by them are equal in order to ascertain that the telemeter is actually adjusted for the distance between the observer and the sighted object.

The currents fed by the two photo-cells may be compared very simply by different electric circuits, chiefly circuits including bridges.

FIGURE 5 illustrates a mechanism which allows obtaining the operation described with reference to FIGURE 1. In this case, the telemeter includes a supporting plate 11 to which is rigidly secured a first slideway 12 while a second slideway 13 is pivotally secured to said plate 11 round a pivot 14.

Referring more particularly to FIGURE 6, it is apparent that the slideway 12 carries at its front end a fitting 15 for the lens 1, said fitting extending into a tubular shade 16 coaxial with the optic axis of the lens 1 and terminating at a point adjacent the photo-cell 5. The latter is carried by a support including a small plate 17 adapted to slide in the slideway 12. Said support for the photo-cell 5 is urged towards the lens 1 by a bent spring blade 18. The small plate 17 carries a stud 19 adapted to abut against the cam 20 pivotally secured to a pin 21 carried by the slideway 12 and controlled in the manner disclosed hereinafter.

The slideway 13 carries practically the same equipment as the slideway 12, to wit a fitting 22 for the lens 2, which is also provided with a coaxial tubular shade 23. The photo-cell 6 is secured similarly to a support including a small plate 17' subjected to the action of a bent spring blade 18' and held in position by a stud 19' abutting against a further cam 24. This further cam is secured rigidly to the supporting plate 11.

The two slideway 12 and 13 are each provided with a lateral lug engaged by the corresponding end of a spring 25 urging the pivoting slideway 13 against a third cam 26 carried by a spindle 27 revolvably carried by the supporting plate 11 and carrying a knob which is not illustrated and is adapted to control the telemeter through the angular setting of the slideway 13. In fact, a rotation of the cam 26 causes the slideway 13 to pivot and to move more or less far away from its position of rest for which its axis is parallel with that of the slideway 12. When the slideway 13 pivots round the pivot 14, the movement between the stud 19' over the stationary cam 24 produces a shifting of the cell 6 along the axis of said slideway 13. The outline of the cam 24 is defined obviously in a manner such that the image formed by the lens 2 remains focused in the plane of the cell when the object forming said image lies at the distance from the telemeter defined by the angle between the convergent slideways 12 and 13.

The pivotal movement of the slideway 13 is accompanied by a corresponding pivotal movement of the cam 20 on the stationary slideway 12, which cam 20 is connected with the slideway 13 through the agency of a connecting rod 28 fitted on studs such as 29 carried by the cam 20 and by the slideway 13. The angular shifting of the cam 20 produces thus a shifting of the stud 19 and consequently of the cell 5 so that the latter may always be located at a distance from the lens such as will produce an accurate focusing on said photo-cell of an object lying at a distance corresponding to the actual relative angular position between the slideways 12 and 13.

In the example illustrated, the whole mechanism is protected by a cover 30 fitted over the supporting plate 11 and provided with gates 31 and 32 in registry with the lenses 1 and 2 respectively.

In the arrangement according to the diagrammatic FIGURE 1, it is necessary for the area of the photo-cell to correspond approximately with the area of the image formed by each optic system 1 and 2. FIGURE 2 illustrates two concentrically arranged framing lines $a$ and $b$ and assuming that the framing line $a$ forms the outline of the photo-cell and the framing line $b$ that of the image formed on it by one of the optic system, it will be readily understood that the photo-cell supplies a current of an unvarying intensity whatever may be the location of the image carried inside the framing line $b$, provided said image is not partly shifted beyond the edge of the framing line $a$.

For a reverse condition, that is if the photo-cell is substantially smaller than the image, the same drawback may arise in the case where the image shows a compartively uniform illumination. It is therefore preferable for the surface of the image to correspond approximately to that of the photo-cell.

In order to increase the accuracy of the telemeter, it is of advantage to juxtapose a plurality of photo-cells across each optic axis. The simplest manner of operating in such a case consists in positioning only two cells in the same plane in joining relationship behind each optic system. The separating plane between two associated cells is preferably perpendicular to the plane containing the two optic axes 3 and 4. This improves considerably the criticality of the condition of equilibrium between the currents fed by the cells and the accuracy of the telemeter is thus substantially increased.

FIGURES 3 and 4 illustrate such a double cell system including two cells 7–8 and 7a–8a located behind the corresponding optic systems 1 and 2.

The cells are then inserted in the electric bridge illustrated in FIGURE 4. The bridge is fed by a battery 9 and the diagonal arm of the bridge carries an instrument such as 10 adapted to measure the current in said arm.

When the two images formed on the two groups of associated cells are identical, the currents fed by the cells 7 and 7a are equal and the case is the same for the currents fed by the cells 8 and 8a. The electric bridge is therefore balanced and no current flows through the instrument 10. This wiring diagram according to FIGURE 4 is advantageous since it will be readily ascertained that, if a darker or lighter object is set for instance over a comparatively, uniform background and is located in a manner such that its projected image extends across the line separating the two cells, the least shifting of said image with reference to the photo-cell produces immediately a substantial difference between the currents supplied since points the luminous intensity of which differs from that of the background, are shifted from one cell onto the adjacent cell.

Obviously, an increase in the number of cells produces more important modifications in current in the case of a compartively small sighted object since the variations of the current intensity fed by a cell depend not only on the luminous intensity of the moving fraction of the image, but also on the relative area of said image with reference to the total area of the photo-cell. However, the comparison between the currents is made through more intricate means since it is necessary to compare the current fed by each cell of one group with that of the corresponding cell of the other group, the measurement made by the telemeter being accurate when all the cooperating currents are equal two by two.

Obviously, it is possible without by any means modifying the principle of the invention to provide a telemeter wherein the cells are stationary for both optic systems, at least one of the latter incorporating an optic element adapted to modify the position of the image formed on the corresponding cell or group of cells, according to the case.

I claim:

1. In a telemeter, the combination of a support, a first optic system rigid with the support including a first lens system and a photo-cell slidable along the axis of the lens system, a second optic system identical with the first optic system, spaced laterally therefrom and pivotally secured to the support, including a second lens system and a photo-cell slidable along the axis of said second lens system, means connected to the second optic system for angularly shifting the second lens system and for bringing the photo-cell of the second optic system in the focal plane of the second lens system with reference to the crossing point of the axes of both lens systems, further means connecting the first optic system and the second optic system whereby said angular shifting of the second optic system focuses the first-mentioned photo-cell in the focal plane of the first lens system with reference to said crossing point and indicator means connected to both photo-cells for defining the difference between the current intensities fed by both photo-cells.

2. In a telemeter, the combination of a support, a first optic system rigid with the support including a first lens system and a photo-cell slidable along the axis of the lens system, a second optic system identical with the first optic system, spaced laterally therefrom and pivotally secured to the support including a second lens system and a photo-cell slidable along the axis of said second lens system, said second optic system including a cam rigid with the support and extending across said second optic system between the photo-cell and the second lens system a part rigid with the photo-cell of said second optic system and controlled by said cam for maintaining the photo-cell of the second optic system in the focal plane of the second lens system with reference to the crossing point of the axes of both lens systems, a link pivotally secured to the second lens system and controlled by the angular position of the latter, a second cam pivotally secured to the support and to said link to focus the first-mentioned photo-cell in the focal plane of the first lens system with reference to said crossing point, a knob-controlled cam adjusting the angular position of the second lens system, a spring connecting said first and second lens systems and urging said second lens system into engagement with last-mentioned cam and indicator means connected to bath photo-cells for defining the difference between the current intensities fed by both photo-cells.

3. A telemeter including in combination, a support (11), a first slideway (12) mounted in a fixed position on said support (11), a lens (1) and a photo-sensitive cell mounted in said slideway, said cell (5) being mounted for movement in said slideway along the axis of said lens, a second slideaway (13) pivotally mounted (14) on said support (11) and spaced laterally from said first slideway (12), a lens (2) and a photo-sensitive cell (6) mounted in said second slideway, and said cell being mounted for movement in said second slideway along the axis of the lens, spring means (25) connected with each of said slideways (12–13) to urge the rear portion of the second slideway (13) toward the first slideway (12), means (19–20–21–28–29) connecting the first slideway (12) with the second slideway (13), and manually operable cam means (26–27) mounted on said support and urged against the second slideway for controlling the angular position of the second slideway relative to the first slideway against the tension of said spring and indicator means connected to both photo-cells for defining the difference between the current intensities fed by both photo-cells.

4. A telemeter including in combination, a support (11), a first slideway (12) mounted in a fixed position on said support (11), a lens (1) and a photo-sensitive cell (5) mounted in said slideway, said cell being mounted for movement along the axis of said lens, a second slideway (13) pivotally mounted (14) on said support (11) and spaced laterally from said first slideway (12), a lens (2) and a photo-sensitive cell (6) mounted in said second slideway, said cell being mounted for movement along the axis of said lens, spring means (25) connected with each of said first and second slideways (12–13) to urge the rear portion of the second slideway (13) toward the first slideway (12), cam and link means (19–20–21–28–29) connecting the first slideway (12) with the second slideway (13), manually operable cam means mounted on said support and urged against said second slideway (26–27) for shifting the second slideway (13) against the tension of said spring means (25), a stud (19′) on the second slideway (13), and a stationary cam (24) on the support extending across the second slideway between the photo-cell and the lens (11) and engaged by said stud (19′) to effect shifting of the cell (6) along the axis of the second slideway (13) and indicator means connected to both photo-cells for defining the difference between the current intensitives fed by both photo-cells.

References Cited
UNITED STATES PATENTS

| | | | |
|---|---|---|---|
| 3,002,093 | 9/1961 | Kis et al. | 250—83.3 |
| 3,035,176 | 5/1962 | Kis et al. | 250—210 |
| 3,224,319 | 12/1965 | Robert et al. | 88—1 |

JEWELL H. PEDERSEN, *Primary Examiner.*

F. L. EVANS, *Assistant Examiner.*